(12) United States Patent  
Howard et al.

(10) Patent No.: US 8,140,842 B2
(45) Date of Patent: Mar. 20, 2012

(54) CLIENT IDENTIFICATION AND AUTHORIZATION IN AN ASYNCHRONOUS REQUEST DISPATCHING ENVIRONMENT

(75) Inventors: Curtiss James Howard, Raleigh, NC (US); Todd Eric Kaplinger, Raleigh, NC (US); Maxim Avery Moldenhauer, Durham, NC (US); Erinn Elizabeth Koonce, Durham, TX (US); Stephen Joseph Kenna, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 12/129,417

(22) Filed: May 29, 2008

(65) Prior Publication Data

US 2009/0300345 A1    Dec. 3, 2009

(51) Int. Cl.
H04L 29/06 (2006.01)
(52) U.S. Cl. ....................................................... 713/151
(58) Field of Classification Search .................... 713/151
See application file for complete search history.

(56) References Cited

U.S. PATENT DOCUMENTS

| | | | |
|---|---|---|---|
| 7,039,670 B2 * | 5/2006 | Hubbard et al. | 709/201 |
| 7,058,696 B1 * | 6/2006 | Phillips et al. | 709/217 |
| 7,080,385 B1 * | 7/2006 | Collison et al. | 719/318 |
| 7,254,579 B2 * | 8/2007 | Cabrera et al. | 1/1 |
| 7,512,880 B2 * | 3/2009 | Morris | 715/700 |
| 7,721,104 B2 * | 5/2010 | Salo et al. | 713/176 |
| 7,948,955 B2 * | 5/2011 | Shi | 370/338 |
| 2003/0120593 A1 * | 6/2003 | Bansal et al. | 705/39 |
| 2005/0135260 A1 * | 6/2005 | Todd | 370/241 |
| 2007/0050630 A1 * | 3/2007 | Kumar et al. | 713/182 |
| 2009/0138792 A1 * | 5/2009 | Cudich et al. | 715/234 |
| 2009/0150502 A1 * | 6/2009 | Pallamreddy et al. | 709/206 |

* cited by examiner

*Primary Examiner* — Edan Orgad
*Assistant Examiner* — James Turchen
(74) *Attorney, Agent, or Firm* — Cuenot, Forsythe & Kim, LLC

(57) ABSTRACT

The present invention provides client and server identity validation in an asynchronous request dispatching environment with client-side aggregation. An application server receives an asynchronous include request from a client. A first unique identifier associating the client with the asynchronous include is generated and sent to a results server. A second unique identifier identifying the results server is generated and sent to the application server. Results of the asynchronous include are stored in the results server. The application server sends the first and second unique identifiers to the client, which polls the results server and sends the second unique identifier to the results server. The results server uses the second unique identifier to verify the identity of the client. The results server sends the first unique identifier to the client. The client uses the first unique identifier to validate the identity of the results server.

13 Claims, 4 Drawing Sheets

CLIENT IDENTIFICATION AND AUTHORIZATION IN AN ASYNCHRONOUS REQUEST DISPATCHING ENVIRONMENT

CROSS-REFERENCE TO RELATED APPLICATIONS

The present application is related to U.S. patent application Ser. No. 11/846,423.

FIELD OF THE INVENTION

The present invention relates generally to asynchronous execution of requests on a distributed computer system, and more particularly to client and server identity validation in an asynchronous request dispatching environment.

BACKGROUND OF THE INVENTION

Clients use distributed computer environments to perform a variety of tasks across multiple applications. In general, a client sends a request to an application server in a distributed computer environment. The application server is a computer acting as an intermediary between the client and other resources making up the distributed computer environment, and it may perform tasks such as verifying the client's security credentials and determining which resource on the distributed computer environment is appropriate for executing the client's request. The application server then forwards the request to the appropriate resource on behalf of the client. After the request executes on the appropriate resource, the application server sends the response to the client.

Fragment markup and assembly technologies known in the art allow for fragmentation of client requests at the application server. Requests are fragmented into multiple smaller tasks or "fetches" and are distributed across multiple resources for execution. Fragmentation allows for more efficient use of resources and for lower cycle-times on a distributed computer environment. After all of the fragments are executed, the responses to each fragment are aggregated.

However, if the fragments execute only in sequence, there can be a long delay from the time the request is made until the fragment responses are aggregated. To shorten this delay, methods have been developed for asynchronous execution of fragments. If the fragments can be executed in any order, including simultaneously, the overall execution time is reduced.

In some asynchronous fragment execution systems, the aggregation of the fragment responses takes place at the application server side, thus tying up application server system resources. In particular, the application server is tied up with the execution thread until the entire request is executed, thus delaying the delivery a of response to the client. To overcome this problem, systems have been developed for client-side aggregation of fragment responses. Such a system is disclosed in a U.S. patent application Ser. No. 11/846,423 owned by IBM (International Business Machines Corporation, Armonk, N.Y.). In that system, a new thread is created for the execution of each asynchronous include request from a client, and the asynchronous include for each request is registered with a results server. Asynchronous include content in the response provided to the client is replaced with javascript. After the client receives the response, the client runs the javascript which queries the results server for the asynchronous include results, which are then aggregated into the final response by the client.

For the sake of clarity, a simplified, generic version of this system is now discussed with reference to FIG. 1. Client 102, application server 104, results server 106, and private server 108 are connected by a network. Application server 104 and results server 106 are public servers that may be directly accessed by client 102. Data from private server 108 is indirectly accessible by client 102 via results server 106.

Client 102 makes a request 110 to application server 104, the request containing one or more asynchronous includes. Application server 104 executes the asynchronous include from the request, and registers 115 the request with results server 106. Application server 104 then prepares javascript that will eventually query results server 106 and aggregate at client 102 the asynchronous include content requested by client 102. Application server 104 then sends an initial response 120 back to client 102, the response containing the javascript and a unique identifier in place of the asynchronous include content requested. Application server 104 executes asynchronous includes 125 with private server 108, and publishes 130 the results at results server 106. The javascript now at client 102 then runs and queries 135 the results server 106 for the asynchronous include content initially requested by client 102. The asynchronous include content is then returned 140 to client 102 where it is aggregated to form the complete response initially requested 110 by client 102.

However, a problem with this approach is that not only must the requesting client be authorized to query results from the results server, but the querying client must also be verified as the same client that made the initial request to the application server. Although the problem of authorization may be solved with known methods, there is a need for a way to verify that the querying client is the same as the initial requesting client. Additionally, there is a need for a way for the querying client to verify that the results received from the result server are in fact being returned from the result server that is associated with the public server the client made the initial request to.

SUMMARY OF THE INVENTION

The present invention solves these problems by providing a system in which internal tokens can be shared amongst a client and public servers for the purpose of identity validation and, indirectly, authorization. An application server receives an asynchronous include request from a client. A first unique identifier associating the client with the asynchronous include is generated by the public server and sent to a results server. A second unique identifier identifying the results server is generated by the results server and sent to the application server. Results of the asynchronous include are stored in the results server. The application server sends the first and second unique identifiers to the client, which polls the results server and sends the second unique identifier to the results server. The results server uses the second unique identifier to verify the identity of the client. The results server sends the first unique identifier to the client. The client uses the first unique identifier to validate the identity of the results server.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION

Exemplary embodiments of the invention are described in detail below with reference to the appended figures, wherein like elements are referenced with like numerals throughout. The figures are not necessarily drawn to scale and do not necessarily show every detail or structure of the various embodiments of the invention, but rather illustrate exemplary embodiments and features in order to provide an enabling description of such embodiments.

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software" refers herein to any set of instructions operable to cause computer hardware to perform an operation. A "computer" includes without limitation any useful combination of hardware and software, and a "computer program" or "program" includes without limitation any software operable to cause computer hardware to accept, perform logic operations on, store, or display data. A computer program may include a plurality of smaller programming units, including without limitation subroutines, modules, functions, methods, and procedures. Thus, the functions of the present invention may be distributed among a plurality of computers and computer programs. The invention is described best, though, as a computer program that configures and enables one or more general-purpose computers to implement the novel aspects of the invention.

Figure 1:
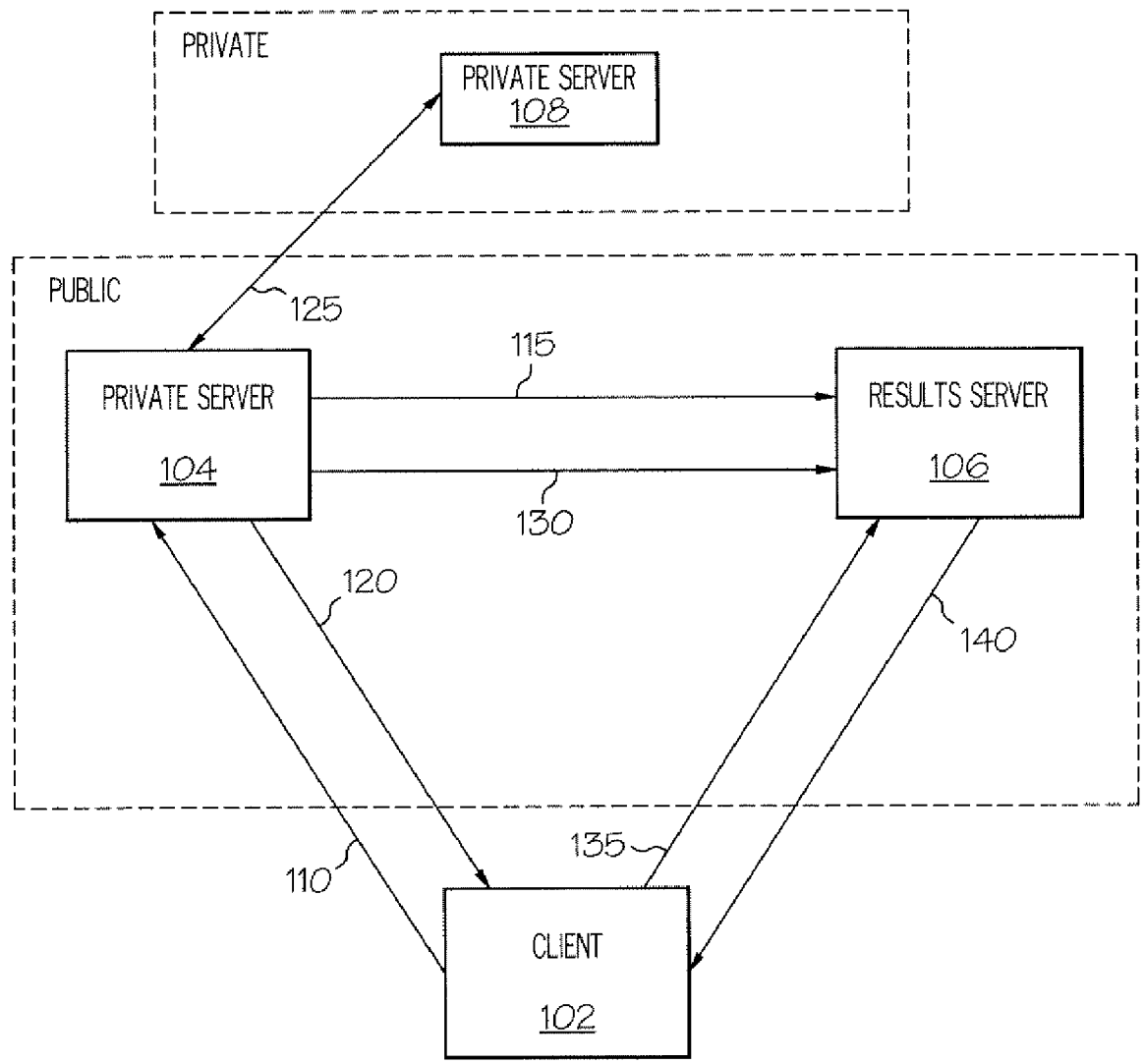
FIG. 1 illustrates a generic version of a distributed computing system.
Figure 2:
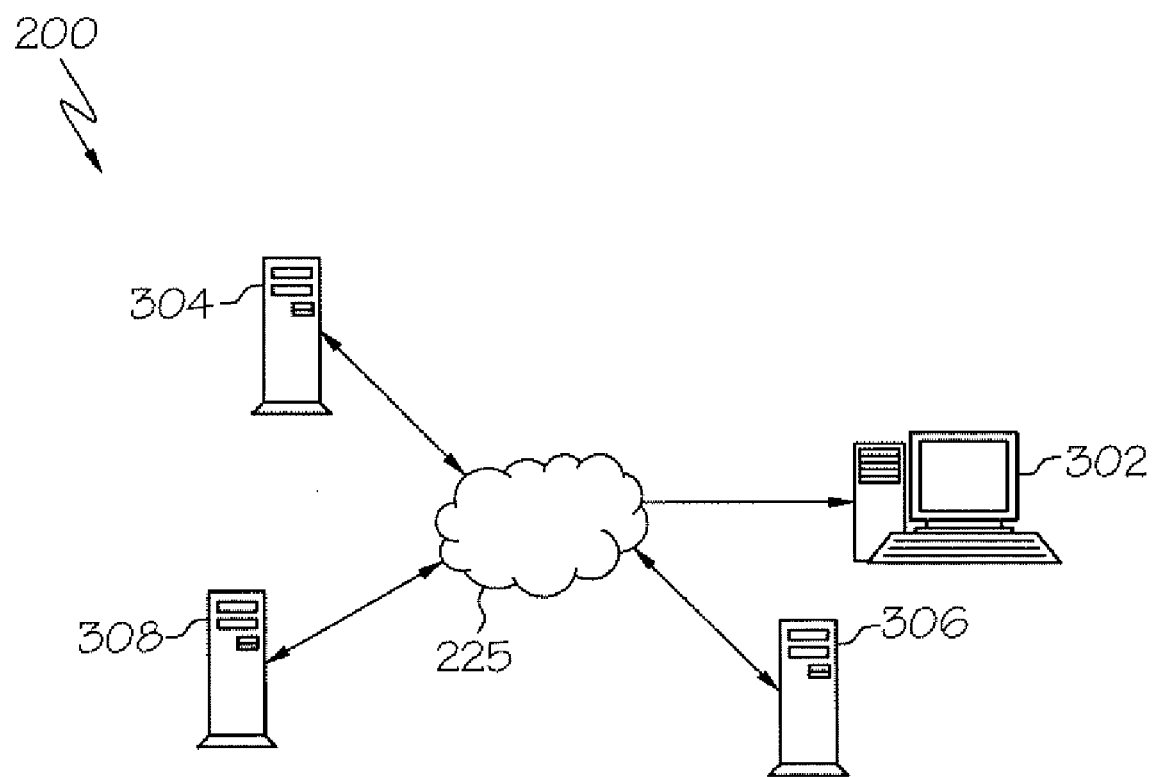
FIG. 2 depicts an exemplary network.

Additionally, the invention is described below with reference to an exemplary network of hardware devices, as depicted in FIG. 2. A "network" comprises any number of hardware devices coupled to and in connection with each other through a communications medium, such as the Internet. A "communications medium" includes without limitation any physical, optical, electromagnetic, or other medium through which hardware or software can transmit data. For the sake of clarity only, and without limitation, exemplary network 200 has only a small number of nodes, including client 302, application server 304, results server 306, and private server 308. Network connection 225 comprises all hardware, software, and communications media necessary to enable communication between network nodes. Unless otherwise indicated, all network nodes use publicly available protocols or messaging services to communicate with each other through network connection 225.

The present invention provides a system and method for validation of the identities of clients and servers in an environment of asynchronous request dispatching with client-side aggregation of responses. One such environment is disclosed in U.S. patent application Ser. No. 11/846,423 owned by IBM (International Business Machines Corporation, Armonk, N.Y.). After being discussed generally, the present invention will be discussed in reference to this environment, it being understood, however, that this example is illustrative and the scope of the invention is to be defined by the appended claims only.

Figure 3:
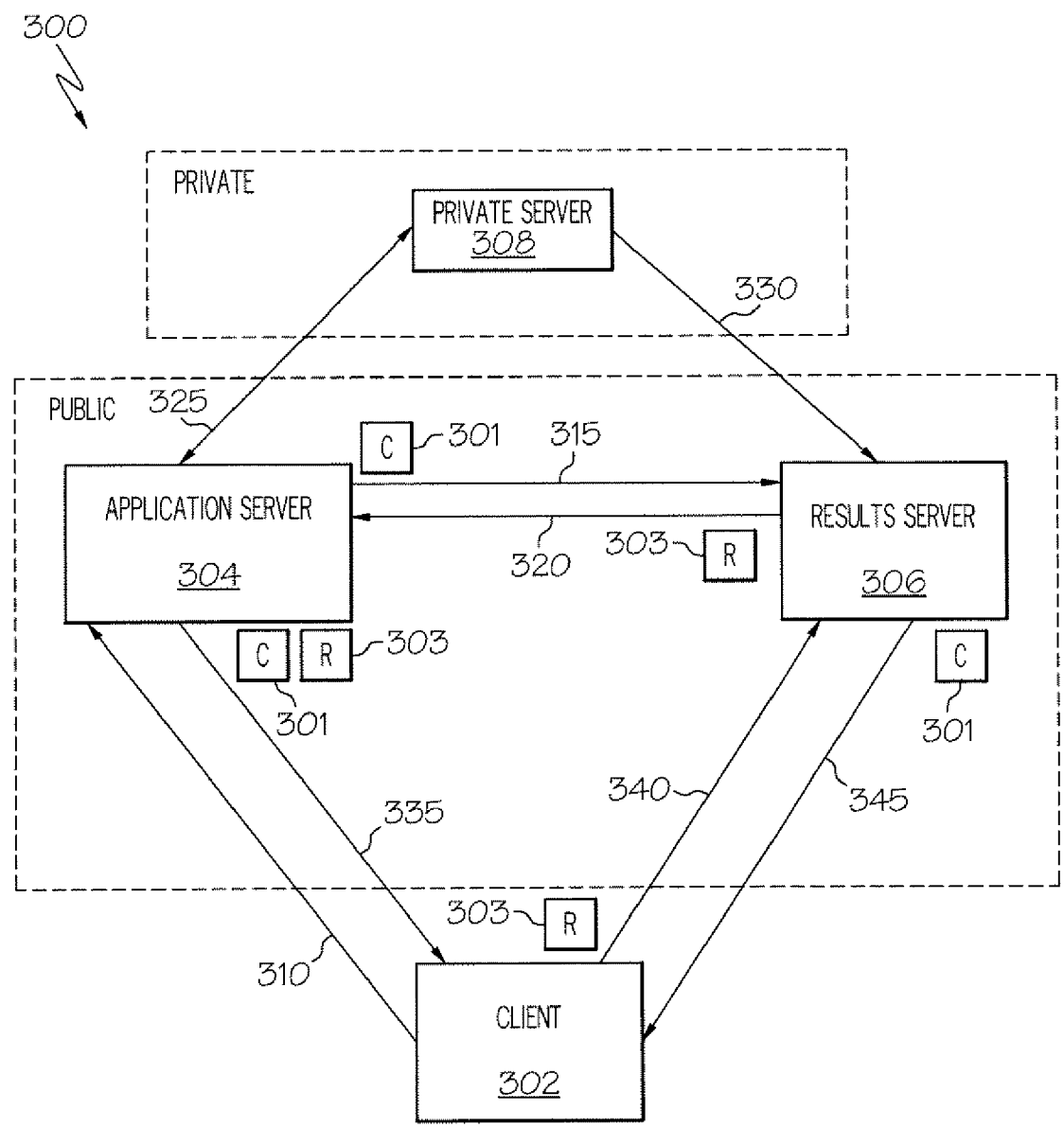
FIG. 3 depicts a flow chart of the inventive process.

The present invention will now be discussed with reference to FIGS. 3 and 4. FIG. 3 shows a network 300 including client 302, application server 304, results server 306, and private server 308. Application server 304 and results server 306 are public servers with which client 302 can directly communicate. Client 302 cannot directly communicate with private server 308. Instead, client 302 must communicate with private server 308 via application server 304 or results server 306 as results are pushed from private server 308 to results server 306 as the results complete. Accordingly, once application server 304 initially authenticates client 302 (using known methods), client 302 has access to both application server 304 and results server 306.

Client 302 makes an initial authenticated request 310 to the public application server 304. The request 310 contains at least one asynchronous include. In response, application server 304 generates a client token 301. Client token 301 associates client 302 with the corresponding asynchronous include. Application server 304 registers 315 with results server 306 by sending client token 301 to results server 306. In response, results server 306 generates a results token 303 which identifies results server 306. Results server 306 then forwards 320 results token 303 to application server 304.

Application server 306 then executes asynchronous includes 325 with private server 308, which then pushes 330 the results of each asynchronous include to results server 306 as the results are completed.

Application server 304 returns an initial response 335 to client 302. This response 335 includes client token 301 and results token 303. This response 335 also includes unique identifiers in place of the asynchronous include content initially requested by client 302.

Client 302 then polls 340 results server 306 for the asynchronous include results initially requested. However, results server 306 will not provide the results unless client 302 presents results token 303. Because results server 306 previously generated results token 303 and sent it to application server 304, the results token 303 serves as proof that client 302 previously communicated with application server 304. If results server 306 successfully verifies that the token presented by client 302 matches the results token 303 that results server 306 previously generated, results server 306 will send 345 the results to client 302, along with client token 301.

When client 302 receives the asynchronous include results with the client token 301, client 302 verifies that the token presented by the results server 306 matches the client token 301 that client 302 previously received from application server 304. By verifying that this is the case, client 302 has proof that results server 306 previously communicated with application server 304. In this way, the present invention allows the client 302 to verify the identity of the results server 306, and the results server 306 to verify the identity of client 302.

Figure 4:
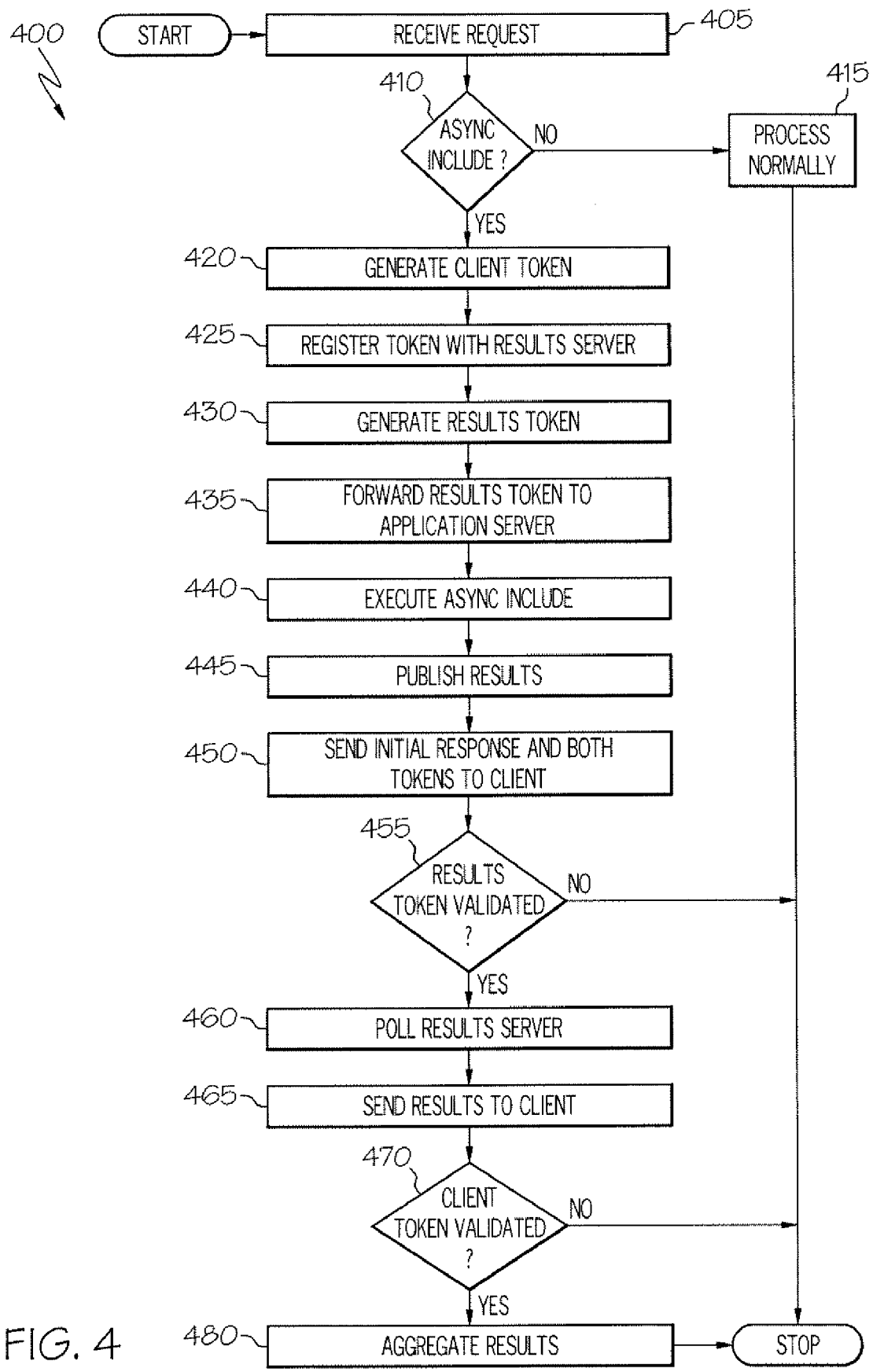
FIG. 4 depicts a flow chart of the inventive process.

FIG. 4 is a flow chart showing the logic 400 of the present invention. The process begins when the application server receives a request from a client 405. The application server determines whether the request contains an asynchronous include 410. If not, the request is processed normally 415. If the request does contain an asynchronous include, the application server generates a client token 420 to associate the requesting client with the asynchronous include. The application server then registers the client token with the results server 425. The results server then generates a results token 430 and forwards the results token back to the application server 435.

The application server then executes the asynchronous includes in the client's request utilizing one or more private servers 440. Next, the results are published at the results server 445. The application server sends an initial response (with unique identifiers in place of the asynchronous include content) back to the client 450, the initial response including both the client token and the results token. In an alternative embodiment, this step 450 may occur before the results are published at the results server 445, or before the application server executes the asynchronous includes 440.

After results are available at the results server, the client presents the results token to the results server for validation 455. If the results server determines that the token presented by the client is the same token previously generated by the results server, the token is validated and the client is permitted to poll the results server 460. In response to being polled, the results server sends the requested results (along with the client token) to the client 465. The client then validates the client token to make sure it is the same token previously received from the application server at step 450. If so, the client is assured that the results received are the results that were in fact requested, and client-side aggregation of the results can occur 480.

In some embodiments of the invention, SSL (secure sockets layer) encryption may be used to add additional security, as is known in the art. For example, the passing of client token and/or results token may be encrypted using SSL. Likewise the asynchronous include results sent to the client may be encrypted using SSL.

Various modifications and alterations of the invention will become apparent to those skilled in the art without departing from the spirit and scope of the invention, which is defined by the accompanying claims. For example, it should be noted that steps recited in any method claims below do not necessarily need to be performed in the order they are recited. For example, in certain embodiments, steps may be performed simultaneously. The accompanying claims should be construed with these principles in mind.

What is claimed is:

1. A computer implemented process for validating the identities of a client and a results server in an asynchronous request dispatching environment, the computer implemented process comprising:
   receiving a request from a client, the request containing at least one asynchronous include;
   generating, at a application server, a first unique identifier associating the client with the asynchronous include;
   sending the first unique identifier to a results server;
   generating, at the results server, a second unique identifier identifying the results server;
   sending the second unique identifier to the application server;
   executing the asynchronous include with at least one private server;
   storing asynchronous include results in the results server;
   the application server sending an initial response, the first unique identifier, and the second unique identifier to the client;
   the client sending the second unique identifier to the results server; the client polling the results server for asynchronous include results;
   validating the identity of the client by verifying that the second unique identifier sent by the client to the results server matches the second unique identifier that was previously generated;
   the results server sending the asynchronous include results and the first unique identifier to the client; and
   the client validating the identity of the results server by verifying that the first unique identifier sent by the results server to the client matches the first unique identifier that was previously generated.

2. The computer implemented process of claim 1, wherein the first unique identifier is generated by the application server.

3. The computer implemented process of claim 1, wherein the second unique identifier is generated by the results server.

4. The computer implemented process of claim 1, wherein validating the identity of the client by verifying that the second unique identifier sent by the client to the results server matches the second unique identifier that was previously generated is performed by the results server.

5. The computer implemented process of claim 1, wherein the application server executes the asynchronous include with the at least one private server.

6. The computer implemented process of claim 1, wherein the first unique identifier and the second unique identifier are tokens.

7. The computer implemented process of claim 6, wherein the tokens are encrypted using SSL.

8. The computer implemented process of claim 1, wherein the asynchronous include results are encrypted using SSL.

9. An apparatus for validating the identities of a client and a results server in an asynchronous request dispatching environment, the apparatus comprising:
   a processor;
   a memory connected to the processor;
   a program operable in the memory to:
      receive a request from a client, the request containing at least one asynchronous include;
      generate, at an application server, a first unique identifier associating the client with the asynchronous include;
      send the first unique identifier to a results server;
      generate, at the results server, a second unique identifier identifying the results server;
      send the second unique identifier to the application server; execute the asynchronous include with at least one private server;
      store the asynchronous include results in the results server; cause the application server to send an initial response, the first unique identifier, and the second unique identifier to the client;
      responsive to the client sending the second unique identifier to the results server, validate the identity of the client by verifying that the second unique identifier sent by the client to the results server matches the second unique identifier that was previously generated;
      send the asynchronous include results and the first unique identifier to the client; and
      validate the identity of the results server by verifying that the first unique identifier sent by the results server to the client matches the first unique identifier that was previously generated.

10. The apparatus of claim 9, wherein the first unique identifier and the second unique identifier are tokens.

11. The apparatus of claim 10, wherein the computer program is further operable to encrypt the tokens using SSL.

12. The apparatus of claim 9, wherein the computer program is further operable to encrypt the asynchronous include results using SSL.

13. A computer program product comprising a computer usable storage device having stored therein computer usable program code for validating identities of a client and a results server in an asynchronous request dispatching environment, the computer usable program code, which when executed on a computer hardware system, causes the computer hardware system to receive a request from a client, the request containing at least one asynchronous include;

generate, at an application server, a first unique identifier associating the client with the asynchronous include;

send the first unique identifier to a results server;

generate, at the results server, a second unique identifier identifying the results server;

send the second unique identifier to the application server;

execute the asynchronous include with at least one private server store the asynchronous include results in the results server;

cause the application server to send an initial response, the first unique identifier, and the second unique identifier to the client;

responsive to the client sending the second unique identifier to the results server, instructions to validate the identity of the client by verifying that the second unique identifier sent by the client to the results server matches the second unique identifier that was previously generated;

send the asynchronous include results and the first unique identifier to the client; and validate the identity of the results server by verifying that the first unique identifier sent by the results server to the client matches the first unique identifier that was previously generated.

* * * * *